(12) United States Patent
Pillai

(10) Patent No.: US 11,256,572 B2
(45) Date of Patent: Feb. 22, 2022

(54) SYSTEMS AND METHODS FOR PROCESSING DATA IN SECURITY SYSTEMS USING PARALLELISM, STATELESS QUERIES, DATA SLICING, OR ASYNCHRONOUS PULL MECHANISMS

(71) Applicant: Honeywell International Inc., Morristown, NJ (US)

(72) Inventor: Girish Krishnaraj Pillai, Fairfax, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1377 days.

(21) Appl. No.: 15/412,257

(22) Filed: Jan. 23, 2017

(65) Prior Publication Data

US 2018/0210792 A1 Jul. 26, 2018

(51) Int. Cl.
| | | |
|---|---|---|
| *G06F 17/00* | (2019.01) | |
| *G06F 7/00* | (2006.01) | |
| *G06F 11/14* | (2006.01) | |
| *G06F 16/27* | (2019.01) | |
| *G06F 16/2453* | (2019.01) | |
| *G06F 16/25* | (2019.01) | |
| *H04L 67/10* | (2022.01) | |

(52) U.S. Cl.
CPC .... *G06F 11/1451* (2013.01); *G06F 16/24532* (2019.01); *G06F 16/256* (2019.01); *G06F 16/27* (2019.01); *G06F 16/273* (2019.01); *G06F 2201/80* (2013.01); *H04L 67/10* (2013.01)

(58) Field of Classification Search
CPC .... G06F 11/1451; G06F 16/27; G06F 16/273; G06F 16/256; G06F 16/24532; G06F 2201/80; H04L 67/10

USPC .......................................................... 707/613
See application file for complete search history.

(56) References Cited

U.S. PATENT DOCUMENTS

| | | | | |
|---|---|---|---|---|
| 6,097,944 | A * | 8/2000 | Sandahl | H04B 7/18582 455/422.1 |
| 7,003,560 | B1 * | 2/2006 | Mullen | G06Q 10/06 709/223 |
| 7,325,042 | B1 * | 1/2008 | Soscia | H04L 67/325 709/219 |

(Continued)

OTHER PUBLICATIONS

Entended European search report from corresponding EP patent application 17209831.1, dated May 23, 2018.

*Primary Examiner* — Pavan Mamillapalli
(74) *Attorney, Agent, or Firm* — Seager, Tufte & Wickhem, LLP

(57) ABSTRACT

Systems and methods for processing data using parallelism, stateless queries, data slicing, and/or asynchronous pull are provided. Some methods can include each of a plurality of data pull devices of a central server retrieving data from a respective one of a plurality of regional server databases, wherein a number of the plurality of data pull devices equals a number of the plurality of regional server databases, and wherein the plurality of data pull devices function asynchronously. Additionally or alternatively, some methods can include each of a plurality of threads of a central server retrieving a predetermined size of data from a plurality of regional server databases, wherein the plurality of threads are stateless so that any of the plurality of threads can retrieve the data from any of the plurality of regional server databases.

18 Claims, 3 Drawing Sheets

(56) References Cited

U.S. PATENT DOCUMENTS

| | | | | |
|---|---|---|---|---|
| 7,356,571 | B2* | 4/2008 | Haller | G06Q 20/201 705/20 |
| 8,078,582 | B2* | 12/2011 | Wang | G06F 16/2358 707/648 |
| 8,260,919 | B2* | 9/2012 | Jeong | H04L 63/062 709/225 |
| 8,548,945 | B2* | 10/2013 | Dwyer | G06F 16/24552 707/634 |
| 8,645,458 | B2 | 2/2014 | Natanzon et al. | |
| 9,210,100 | B2 | 12/2015 | Van Der Linden et al. | |
| 9,519,674 | B2* | 12/2016 | Vermeulen | G06F 16/2358 |
| 9,984,139 | B1* | 5/2018 | Ye | G06F 16/21 |
| 2002/0095399 | A1* | 7/2002 | Devine | G06F 16/958 |
| 2002/0103660 | A1* | 8/2002 | Cramon | G06Q 30/06 709/220 |
| 2002/0143952 | A1* | 10/2002 | Sugiarto | H04N 21/25435 709/227 |
| 2003/0084108 | A1* | 5/2003 | Syed | G06F 16/958 709/206 |
| 2004/0098373 | A1 | 5/2004 | Bayliss et al. | |
| 2004/0249918 | A1* | 12/2004 | Sunshine | H04L 41/0846 709/223 |
| 2005/0044064 | A1 | 2/2005 | Haase | |
| 2006/0200501 | A1* | 9/2006 | Holenstein | G06F 16/275 707/999.202 |
| 2007/0162516 | A1* | 7/2007 | Thiel | G06F 16/273 707/999.201 |
| 2008/0065591 | A1 | 3/2008 | Guzenda | |
| 2010/0095014 | A1* | 4/2010 | Zuckerman | H04L 67/101 709/231 |
| 2010/0318858 | A1* | 12/2010 | Essawi | G06F 16/21 714/49 |
| 2012/0150829 | A1* | 6/2012 | Bourbonnais | G06F 16/273 707/703 |
| 2013/0041888 | A1 | 2/2013 | Eisner et al. | |
| 2016/0055300 | A1* | 2/2016 | Ganesh | G16H 10/60 705/3 |
| 2016/0057226 | A1 | 2/2016 | Bestler et al. | |

* cited by examiner

SYSTEMS AND METHODS FOR PROCESSING DATA IN SECURITY SYSTEMS USING PARALLELISM, STATELESS QUERIES, DATA SLICING, OR ASYNCHRONOUS PULL MECHANISMS

FIELD

The present invention relates generally to security systems. More particularly, the present invention relates to systems and methods for processing data in security systems using parallelism, stateless queries, data slicing, and/or asynchronous pull mechanisms.

BACKGROUND

Security systems are known to include a central server and a plurality of regional servers in communication with the central server. For example, regional servers report detected alarms or events to the central server in real time, and data at the regional servers is replicated at the central server.

In some known security systems, Microsoft replication, which has a very strict architecture of distributor/publisher and subscriber, is employed, and snapshots of server databases are used as a starting point to upgrade the databases. However, when a database of one of the servers is large, generating a snapshot can be a time consuming process on the order of days, thereby slowing down the system considerably and delaying startup.

Known systems also employ merge and transactional replication for events such that regional server databases are polled at regular intervals, for example, every five seconds. However, in large systems in which events are constantly added to regional server databases, tables in the databases can be very large. Indeed, transactional replication for events can downgrade the performance of regional server databases to the point that such replication must be disabled for the system to work effectively.

The replication described above can create table level locks in known systems and methods. For example, because a data pulling schedule is common for all regions in the system, data from tables of the regional servers might be pulled at the same time in an attempt to insert such data into a table of the central server. However, when known systems and methods attempt to write to the same table at the same time, table level locks are created, and the system fails.

Furthermore, in known security systems, a replica of a database at a central server must be a perfect match with a regional server database. Therefore, the central server and the regional servers cannot include different versions or schemas of databases, and upgrading the databases requires rebuilding the databases from scratch and restarting any such rebuild should installation fail partway through. For example, bottlenecks occur during upgrade because upgrading requires an uninstall, an upgrade, and a re-install. Similarly, in new installations, because the schema of the databases can be modified, if a thread goes out of synch, then the installation fails, and there is no way to recover from the failure point; a complete re-install is required. All of the above can cause significant down time for regional servers.

Further still, because known security systems use replication to copy data from the regional servers to the single central server, multiple copies of the regional server databases are created, and data from all of the regional servers must be copied to the central server. These multiple copies slow down processing times and consume memory.

In view of the above, there is a continuing, ongoing need for improved systems and methods.

DETAILED DESCRIPTION

Figure 1:
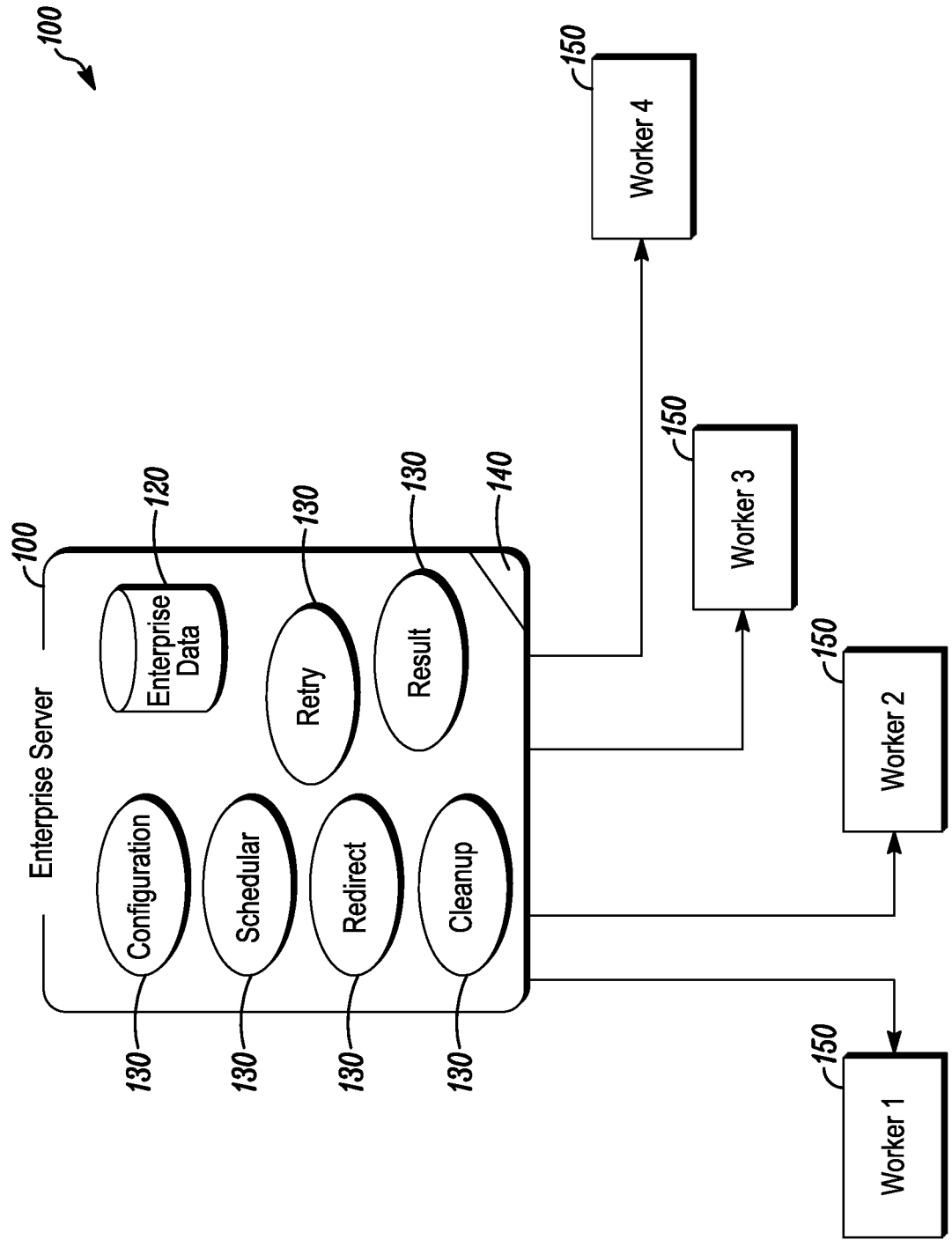
FIG. 1 is a block diagram of a central server in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for processing data in security systems using parallelism, stateless queries, data slicing, and/or asynchronous pull mechanisms to reduce the amount of data processed and the amount of time to process such data.

Systems and methods in accordance with disclosed embodiments can include a central server and a plurality of regional servers in communication with the central server, and a majority of data processing for the system can occur on the central server. For example, the central server can implement a pull or call mechanism to retrieve data from the regional servers, and the central server can act as a data warehouse.

It is to be understood that systems and methods disclosed herein do not employ Microsoft replication. Therefore, systems and methods disclosed herein need not include multiple copies of regional server databases.

It is also to be understood that systems and methods disclosed herein do not need snapshots of server databases to upgrade the databases. Instead, when upgrading the databases, systems and methods disclosed herein can employ an anchor mechanism such that the starting point of a database can be configurable and identified by a user. In some embodiments, changes can be maintained within the database of each regional server, and the central server can capture such changes for writing to a table on an as needed basis. Nevertheless, in some embodiments, the central server database can always reflect the current state of the system or the last point in time when data from the regional servers was captured, thereby making the central server highly scalable.

It is also to be understood that the central server and the regional servers disclosed herein can include different versions or schemas of a database. For example, in some embodiments, a user can inject custom logic or rules into one or both of the central server and the regional server to override default values, and the rules can be determinative of outcomes when schemas are mismatched, such as alerting a user, logging the state of the database, or embedding a value or a null value. Furthermore, in some embodiments, systems and methods disclosed herein can implement template mapping to identify matching portions of the databases when the database of the central server is not a perfect match with the database of a regional server.

In some embodiments, a central server as disclosed herein can implement microservice architecture so that the central server includes a plurality of data pull mechanisms or devices in one to one ratio with the plurality of regional servers in communication with the central server. That is, the central server can implement one data pull mechanism or device for each regional server in communication with the central server to achieve high parallelism. In this manner, each of the data pull mechanisms can function in an asynchronous manner with respect to each other, and each of the data pull mechanisms can wake up at respective predetermined time intervals to identify and capture any changes in a respective regional server database. Because the data pull mechanisms can function asynchronously, data can be pulled in a non-blocking fashion.

In some embodiments, a central server as disclosed herein can implement an internal thread pool to achieve high parallelism, and in some embodiments, a central server as disclosed herein can implement data slicing to improve query performance. For example, if the central server allocated one thread per table in its database, then processing time would be as fast as the slowest thread, thereby creating a bottleneck. However, in disclosed embodiments, by using data slicing, each thread can query a predetermined size of data, and no thread is tied to any one table. That is, the threads can be stateless, and whichever thread in the thread pool is free can query data for processing. In this manner, the thread pool of the central server as disclosed herein can intelligently determine the load for the thread pool and process the load accordingly. Indeed, when data is ready to be retrieved, a thread can issue a query, fetch the data, and free up space so other threads can execute. Furthermore, in this manner, table level locks can be avoided because, at any point in time, multiple threads will not attempt to access the same table. Instead, the threads with data for the same table can be assigned a respective spot in an assigned order for writing to the table.

In some embodiments, systems and methods disclosed herein can include different data queues, wherein each data queue can hold data in a different state. When the central server pulls data from a regional server, the central server can place the data in a queue according to the state of the data. However, when the data is processed, the central server can move the data to the processing queue.

FIG. 1 is a block diagram of a central server 100 in accordance with disclosed embodiments. As seen in FIG. 1, the central server 100 can include control circuitry 110, which can include a memory device 120, one or more programmable processors 130, and executable control software 140 as would be understood by one of ordinary skill in the art. The memory device 120 can include the database and/or tables as described above, and the executable control software 140 can be stored on a transitory or non-transitory computer readable medium, including, but not limited to, local computer memory, RAM, optical storage media, magnetic storage media, flash memory, and the like. In some embodiments, some or all of the control circuitry 110, the programmable processors 130, and the control software 140 can execute and control at least some of the methods described above and herein.

The control circuitry 110 can implement, include, or be in communication with one or more data pull devices 150, each of which can identify and capture changes in a respective regional server database. As explained above, the number of data pull devices 150 can correspond to the number of regional servers in communication with the central server 100 on a one to one basis.

Figure 2:
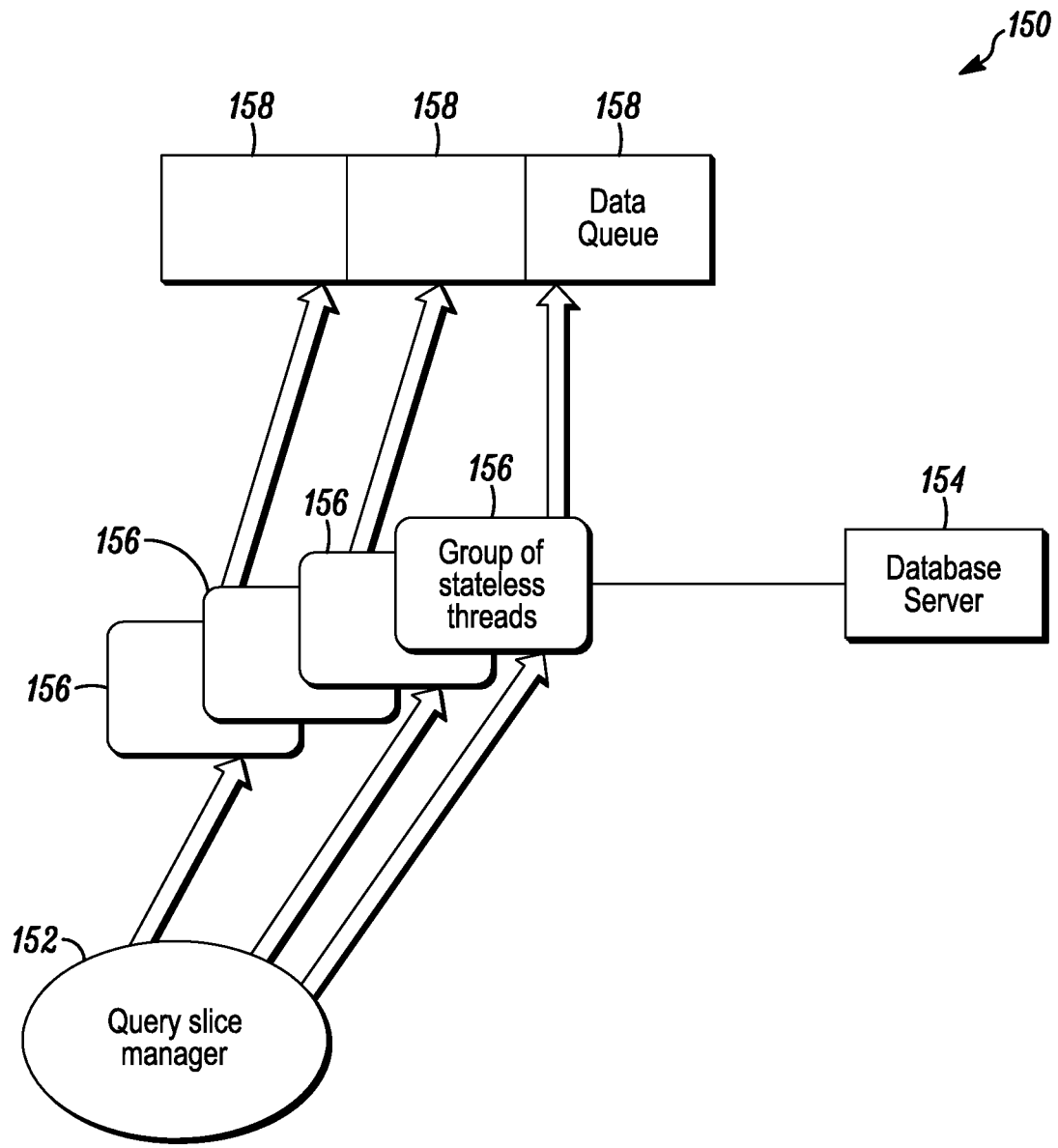
FIG. 2 is a block diagram of a pull device of a central server in accordance with disclosed embodiments.

FIG. 2 is a block diagram of one of the data pull devices 150 of the central server 100 in accordance with disclosed embodiments. As seen in FIG. 2, the data pull device 150 can include control circuitry or a programmable processor 152 that manages data slicing for queries to a respective regional server database 154. The programmable processor 152 can instruct each of a plurality of threads 156 to query a predetermined size of data from the regional server database 154, and each of the plurality of threads 156 can place retrieved data in one of a plurality of data queues 158, depending on the state of the retrieved data.

Figure 3:
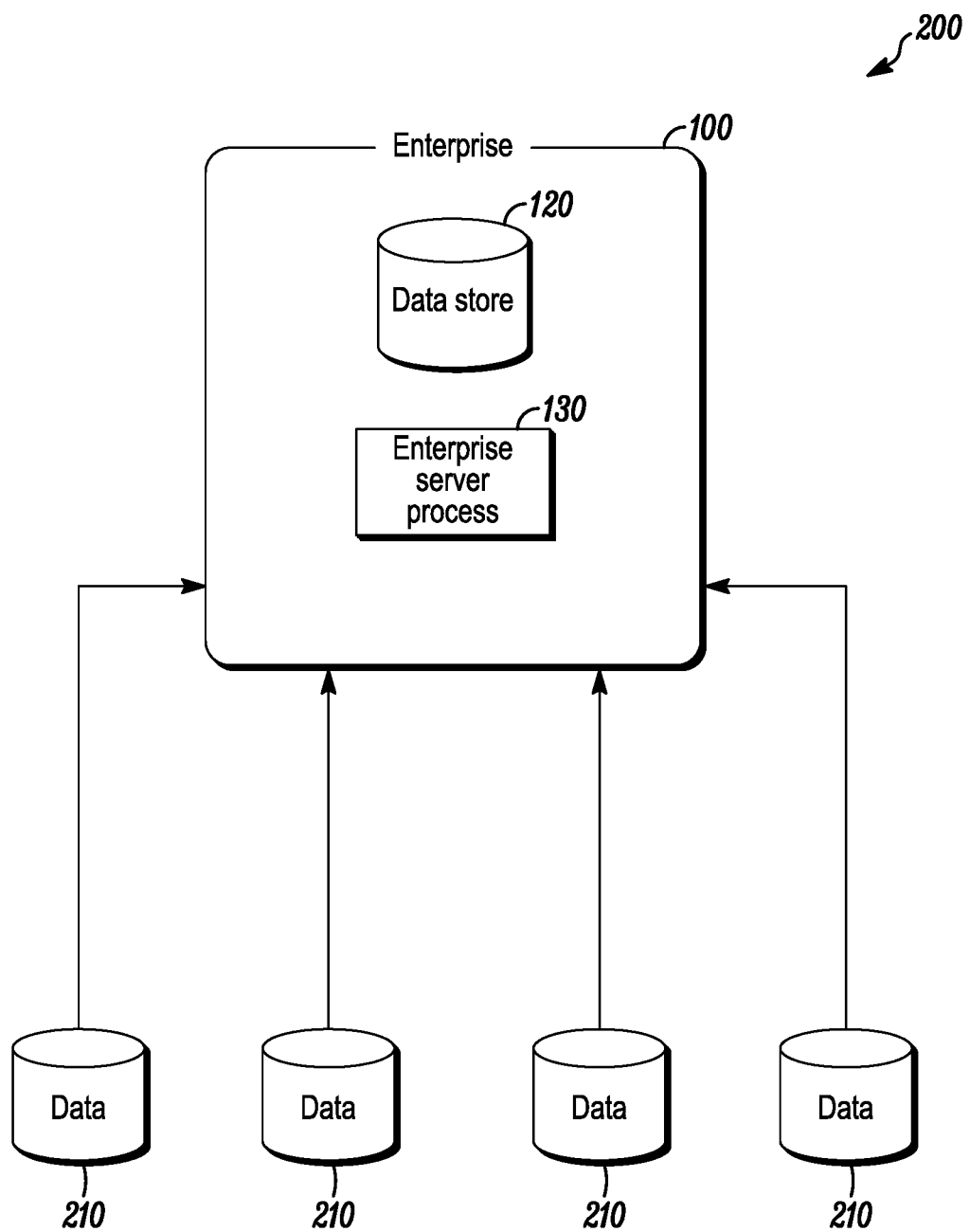
FIG. 3 is a block diagram of a system in accordance with disclosed embodiments.

FIG. 3 is a block diagram of a system 200 in accordance with disclosed embodiments. As seen in FIG. 3, the system 200 can include the central server 100, which can include the memory device 120 and the processor(s) 130, in communication with a plurality of regional server databases 210. As explained above, the central server 100 can pull data from the regional server databases 210 asynchronously.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method for processing data in a security system, the method comprising:
   each of a plurality of data pull devices of a central server pulling data from a respective one of a plurality of regional server databases,
   wherein a number of the plurality of data pull devices equals a number of the plurality of regional server databases,
   wherein the plurality of data pull devices function asynchronously,
   wherein each of the plurality of data pull devices is programmed to pull the respective data from the respective one of the plurality of regional server databases at a respective predetermined time interval,
   wherein the respective predetermined time interval for a first of the plurality of data pull devices is different than the respective predetermined time interval for a second of the plurality of data pull devices, and
   wherein a central server database has a first schema, and wherein one of the plurality of regional server databases has a second, different schema, and the central server executing a template matching process to identify portions of the central server database matching portions of the one of the plurality of regional server databases.

2. The method of claim 1 further comprising:
   configuring a starting point of each of the plurality of regional server databases; and
   pulling the data from the plurality of regional server databases associated with time after the starting point.

3. The method of claim 2 further comprising configuring the starting point based on received user input.

4. The method of claim 1 wherein changes within each of the plurality of regional server databases are maintained within each of the plurality of regional server databases, and wherein the central server captures the changes within each of the plurality of regional server databases as needed.

5. The method of claim 1 wherein the central server includes microservice architecture.

6. The method of claim 1 wherein each of the plurality of data pull devices exits a low power sleep state at the respective predetermined time interval to pull the data from the respective one of the plurality of regional server databases.

7. The method of claim 1 further comprising each of the plurality of data pull devices placing the data from the respective one of the plurality of regional server databases in a respective one a plurality of data queues, wherein the respective one of the plurality of data queues is determined based on a state of the data.

8. A method for processing data in a security system, the method comprising:
   each of a plurality of threads of a central server retrieving a predetermined size of data from a plurality of regional server databases,
   wherein each of the plurality of threads are not assigned to any specific regional server database of the plurality of regional server databases, such that any of the plurality of threads can retrieve the data from any of the plurality of regional server databases, and
   wherein the central server identifies a load for the plurality of threads and assigns each of the plurality of threads to a respective portion of the load.

9. The method of claim 8 further comprising:
   configuring a starting point of each of the plurality of regional server databases; and
   retrieving the data from the plurality of regional server databases associated with time after the starting point.

10. The method of claim 9 further comprising configuring the starting point based on received user input.

11. The method of claim 8 wherein changes within each of the plurality of regional server databases are maintained within each of the plurality of regional server databases, and wherein the central server captures the changes within each of the plurality of regional server databases as needed.

12. The method of claim 8 wherein a central server database has a first schema, and wherein one of the plurality of regional server databases has a second, different schema.

13. The method of claim 12 further comprising the central server executing a template matching process to identify portions of the central server database matching portions of the one of the plurality of regional server databases.

14. The method of claim 8 wherein the central server includes microservice architecture.

15. The method of claim 8 further comprising each of the plurality of threads placing the data from the respective one of the plurality of regional server databases in a respective one of a plurality of data queues, wherein the respective one of the plurality of data queues is determined based on a state of the data.

16. The method of claim 15 further comprising:
   the central server processing the data; and
   the central server moving the data as processed from the respective one of the plurality of data queues to a processed one of the plurality of data queues.

17. A method for processing data in a security system, the method comprising:
   each of a plurality of data pull devices of a central server retrieving data from a respective one of a plurality of regional server databases,
   wherein a number of the plurality of data pull devices equals a number of the plurality of regional server databases and the plurality of data pull devices function asynchronously; and
   each of the plurality of data pull devices placing the data from the respective one of the plurality of regional server databases in a respective one a plurality of data queues, wherein the respective one of the plurality of data queues is determined based on a state of the data.

18. The method of claim 17 further comprising:
   the central server processing the data; and
   the central server moving the data as processed from the respective one of the plurality of data queues to a processed one of the plurality of data queues.

* * * * *